(No Model.)
A. HOUGH.
METHOD OF CONSTRUCTING SECONDARY BATTERIES.
No. 535,541. Patented Mar. 12, 1895.
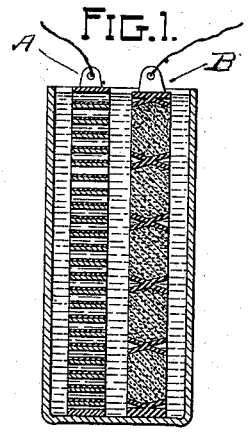
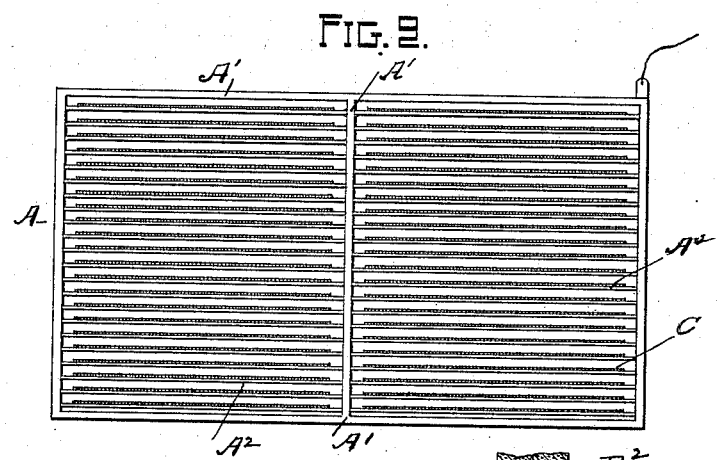
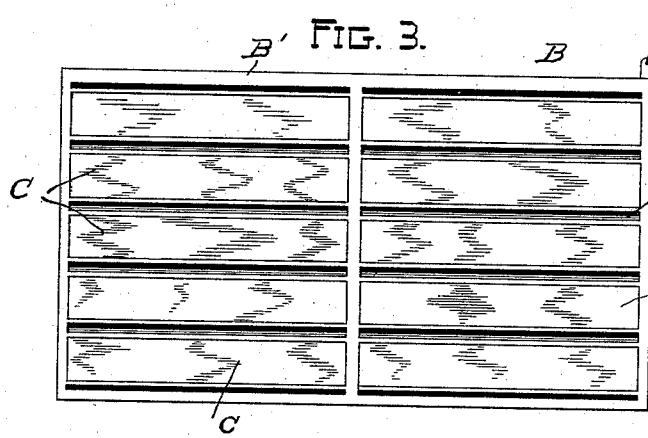
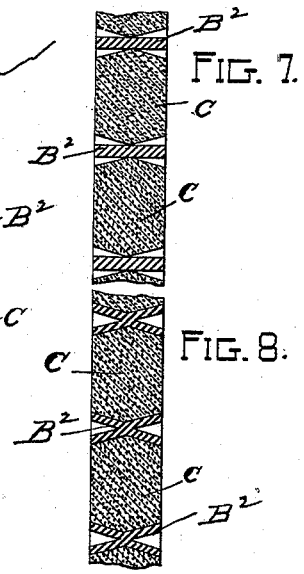
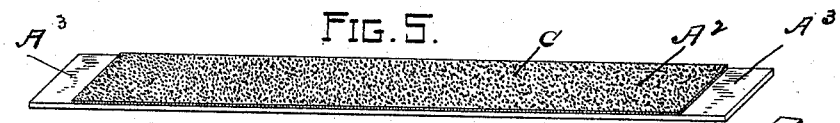
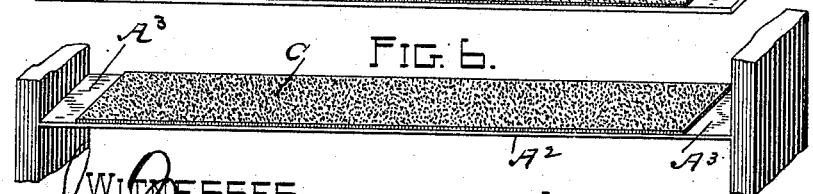
WITNESSES
INVENTOR
Arthur Hough

UNITED STATES PATENT OFFICE.

ARTHUR HOUGH, OF SAN FRANCISCO, CALIFORNIA.

METHOD OF CONSTRUCTING SECONDARY BATTERIES.

SPECIFICATION forming part of Letters Patent No. 535,541, dated March 12, 1895.

Original application filed September 14, 1893. Serial No. 485,478. Divided and this application filed December 14, 1893. Serial No. 493,667. (No model.)

*To all whom it may concern:*

Be it known that I, ARTHUR HOUGH, a subject of the Queen of Great Britain, residing at San Francisco, in the county of San Francisco and State of California, have invented certain new and useful Improvements in Processes of Constructing Secondary Batteries; and I do hereby declare the following to be a full, clear, and exact description of said invention, such as will enable others skilled in the art to which it most nearly appertains to make, use, and practice the same.

This invention relates to an improved process of constructing secondary batteries, being a division of my application, Serial No. 485,478, filed September 14, 1893.

It has for its objects to form a support for the active material used in these batteries which will have large conductivity and lightness, to prevent local action between the support and active material, to protect the support from the action of the electrolyte by placing in conjunction with it a material having a higher electrochemical affinity for the electrolyte; to prevent separation of the active material and the support; and to prevent bursting and buckling of the plates.

In the drawings: Figure 1 is a cross section of a battery cell constructed in accordance with the invention. Fig. 2 is a front view of the spongy lead element. Fig. 3 is a front view of the per-oxide element. Figs. 4, 5, and 6 are detail views showing a section of the support in the successive stages of its construction. Fig. 7 is a detail view of a section of the per-oxide element showing the support before framing the slabs of active material. Fig. 8 is a detail view of a section of the per-oxide element showing the active material framed.

The letters "A" and "B" designate the spongy lead and the per-oxide of lead elements in this battery. They consist of the active material and supports for the same. The active material "C" in both elements is constructed of the same components and mixed in the same way. The formula of this mixture is twelve (12) parts of mon-oxide of lead and one (1) part of sulphate of magnesia. These are mixed dry and thoroughly. The resulting mass is then made into a paste by moistening with sulphate of ammonia. This is accomplished preferably by immersing the plate, loaded with the above described powder, in a sulphate of ammonia bath and retaining it there until it has become so set and hardened as to be able to be handled. At this stage of the operation the plates will be found to be hard and dense, the sulphate of ammonia having slowly decomposed, the sulphuric acid thereof having entered into combination with the mon-oxide of lead and forming sulphate of lead. I prefer to use for this purpose the sulphate of ammonia for the reason that the affinity of the ammonia and sulphuric acid so nearly equals the affinity of mon-oxide of lead for sulphuric acid, that the transfer takes place slowly and more thoroughly. Also by its use I can regulate the amount of sulphate of lead formed and extract the plate when enough has been formed to bind the parts thoroughly together, and in this way preserve a large proportion of the mon-oxide of lead.

The next step in the process is the dissolving out of the plates the sulphate of magnesia which so far has not been affected by the setting process. This I accomplish by immersing the plates in a water bath where the sulphate of magnesia is dissolved out of the plate and the formation of sulphate of lead is arrested. By thus dissolving out the sulphate of magnesia the plate will be found to be highly porous and the resultant plate will be a fine net work of sulphate of lead and mon-oxide of lead.

While I have described the use of sulphate of magnesia in the formation of this plate I do not wish to be understood as confining myself to its use only, as any material which will mechanically mix with mon-oxide of lead and not be affected by the chemical action of the sulphate of ammonia and be soluble in any liquid which will not have any chemical action on the mon-oxide of lead and sulphate of lead, will serve the purpose for which this substance is used, and will meet the spirit of this invention.

The frame "A'" for the spongy lead element may be constructed of any metal but I prefer to use mainly copper, because of its lightness and conductivity. To protect the copper from the action of the electrolyte I place on the copper a quantity of the active material, spongy lead, in excess of that actually required, and thereby preserve the copper from oxidation or dissolution. This plate I construct as shown in the drawings at Figs. 1, 2, 4, 5 and 6. It consists in forming a light lead frame "A'" from which an electrode is run. Between the upright bars of this frame are suspended the shelves "A²" carrying the active material "C" in a thin layer on its upper surface. This active material is placed on the copper shelves "A²" as shown at Fig. 5 so as to leave the ends "A³" bared for connecting them to the uprights of the frame. This connection I accomplish by means of burning as thereby I effect a more perfect joint and prevent any sulphating of the frame between the shelves and frame. These shelves are placed in the frame as close to one another as possible while permitting a free flow of the electrolyte between. In some cases I prefer to place between the copper shelf and active material a thin coating of alloy of lead or other material which will prevent any local action between the copper and spongy lead. By this construction I obtain a large surface contact between the conductor and the active material and am enabled to draw off the maximum current generated.

The frame "B'" for the per-oxide of lead element I construct of an alloy of lead substantially as shown in Figs. 3, 7 and 8 of the drawings. The frame is cast with the cross bars "B²" being spaced to receive the slabs "C" of active material as seen at Fig. 7. The cross bars are then cut by a wheel to throw the sides over the beveled edges of the slab, as at Fig. 8, and retain them in position.

The active material used in the per-oxide of lead element is constructed of the same component parts, and by the same process with the exception that the slabs as herein shown are molded, set, and "formed" before being placed on their supports while, the active material in the spongy lead element is placed on the shelves before being set. To "form" these slabs I immerse them in a suitable electrolyte preferably alkaline or neutral, and pass an electric current through them for several hours in the usual way. By this process the slabs are fully expanded or formed and will not again contract or further expand. They are here taken from the bath, dried, and framed as above described. When now the battery is charged the slabs will not expand and burst or buckle the frame as in other batteries. For this reason I am able to use lighter frames.

When the plates are framed up as described they are charged by immersing them in the electrolyte and passing an electric current through them which produces spongy lead in the plate "A" and per-oxide of lead in the plate "B." In the latter plate this action produces an amalgamation between the surface of support upon which it rests and the active material binding them closely together so that they cannot be separated and fall apart. In this way is formed a strong and substantial plate which will not disintegrate and become destroyed.

Having thus described this invention, what I claim is—

1. The method of constructing a plate for secondary batteries which consists in mixing dry mon-oxide of lead and sulphate of magnesia, producing a paste of the resultant mixture with water and sulphate of ammonia, or an aqueous solution of ammonium sulphate spreading the paste on a support and allowing it to set, then dissolving out the sulphate of magnesia substantially as described.

2. The herein described process of forming elements for secondary batteries consisting in combining mon-oxide of lead and sulphate of magnesia, hardening the same and removing these portions soluble in water; substantially as described.

3. The method of constructing a plate for secondary batteries which consists in mixing dry mon-oxide of lead and a soluble material producing a paste of the resultant mixture with water and sulphate of ammonia or an aqueous solution of the latter and placing it on a support to set, and when set dissolving out the soluble material, substantially as described.

4. The method of constructing active material for secondary batteries which consists in mixing mon-oxide of lead and sulphate of magnesia into a paste with water, setting the same by producing therein sulphate of lead and when set dissolving out the sulphate of magnesia substantially as described.

5. The method of constructing the per-oxide element of a secondary battery which consists in producing active material by mixing dry mon-oxide of lead and a soluble material producing a paste of the resultant mixture with sulphate of ammonia and water, permitting the same to set, then placing the same on a lead frame dissolving out the soluble portions and electrically charging and discharging to amalgamate the contact surfaces of the said active material and the lead frame whereby separation of the active material and support is prevented substantially as described.

6. The method of constructing the per-oxide element of a secondary battery which consists in producing active material by mixing dry mon-oxide of lead and sulphate of magnesia, producing a paste of the resulting mixture with sulphate of ammonia and water, placing the same on a lead frame and when set dissolving out the sulphate of magnesia then electrically charging and discharging to amalgamate the contact surfaces of the said active material and the lead frame substantially as described.

7. The herein described method of constructing a per-oxide of lead plate consisting in combining mon-oxide of lead and sulphate of magnesia in the form of a slab, then dissolving out the sulphate of magnesia and electrolytically expanding or forming it and finally framing the slab whereby when used in the battery the slab is prevented from being worked loose by the electrolytic action; substantially as described.

In testimony whereof I have hereunto set my hand.

ARTHUR HOUGH.

In presence of—
J. M. BECK,
L. G. HARVEY.